(12) United States Patent
Mackintosh et al.

(10) Patent No.: US 8,869,264 B2
(45) Date of Patent: *Oct. 21, 2014

(54) ATTESTING A COMPONENT OF A SYSTEM DURING A BOOT PROCESS

(75) Inventors: David N. Mackintosh, Manchester (GB); Jose J. P. Perez, Manchester (GB); James W. Walker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/241,835

(22) Filed: Sep. 23, 2011

(65) Prior Publication Data

US 2012/0084549 A1    Apr. 5, 2012

(30) Foreign Application Priority Data

Oct. 1, 2010    (EP) .................................... 10185636

(51) Int. Cl.
*G06F 21/00*    (2013.01)
*G06F 21/31*    (2013.01)
*G06F 21/57*    (2013.01)

(52) U.S. Cl.
CPC .............. *G06F 21/575* (2013.01); *G06F 21/31* (2013.01); *G06F 2221/2141* (2013.01)
USPC ................................................. 726/17; 713/2

(58) Field of Classification Search
None
See application file for complete search history.

(56) References Cited

U.S. PATENT DOCUMENTS

| | | |
|---|---|---|
| 6,539,480 B1 | 3/2003 | Drews |
| 6,546,392 B1 * | 4/2003 | Bahlmann ............................. 1/1 |
| 7,191,464 B2 | 3/2007 | Cromer et al. |
| 7,222,062 B2 | 5/2007 | Goud et al. |
| 7,480,804 B2 | 1/2009 | Bade et al. |

(Continued)

FOREIGN PATENT DOCUMENTS

| | | |
|---|---|---|
| EP | 1980970 A2 | 10/2008 |
| WO | WO2012038211 A1 | 3/2012 |

OTHER PUBLICATIONS

Chun et al., "Decentralized Trust Management and Accountability in Federated Systems", Proceedings of the 37th Annual Hawaii International Conference on Systems Sciences, Jan. 2004, 9 pages.

(Continued)

*Primary Examiner* — Jason K. Gee
*Assistant Examiner* — Maung Lwin
(74) *Attorney, Agent, or Firm* — Yee & Associates, P.C.; Jeffrey S. LaBaw

(57) ABSTRACT

A method, apparatus and program product for attesting a component of a system during a boot process. The method comprises the steps of: verifying that the system is in a trusted state; in response to verifying that the system is in a trusted state, requesting an enrollment of the system wherein the requesting step further comprises the step of: retrieving enrollment data associated with the system; retrieving current input data associated with the component of the system; comparing the current input data against the enrollment data in order to determine whether the system can retain its trusted state; wherein in response to the comparing step, if the current input data matches the enrollment data, the system retains its trusted state; and accepting the trusted state until receipt of a notification, from the system having a retained trusted state, of an update to the system.

23 Claims, 6 Drawing Sheets

(56) References Cited

U.S. PATENT DOCUMENTS

| | | | |
|---|---|---|---|
| 7,613,921 | B2 | 11/2009 | Scaralata |
| 8,042,190 | B2 | 10/2011 | Sahita et al. |
| 8,151,262 | B2 | 4/2012 | Challener et al. |
| 8,433,924 | B2 | 4/2013 | Challener et al. |
| 8,549,288 | B2 | 10/2013 | Bade et al. |
| 2002/0194482 | A1 | 12/2002 | Griffin et al. |
| 2005/0039013 | A1* | 2/2005 | Bajikar et al. ............... 713/172 |
| 2005/0138161 | A1 | 6/2005 | McDaniel et al. |
| 2006/0136708 | A1 | 6/2006 | Hajji et al. |
| 2008/0046581 | A1* | 2/2008 | Molina et al. ............... 709/229 |
| 2008/0178176 | A1 | 7/2008 | Berger et al. |
| 2008/0183767 | A1* | 7/2008 | Zhu et al. ............... 707/200 |
| 2008/0189250 | A1* | 8/2008 | Cha et al. ............... 707/3 |
| 2008/0235754 | A1 | 9/2008 | Wiseman et al. |
| 2008/0244569 | A1* | 10/2008 | Challener et al. ............... 718/1 |
| 2008/0281654 | A1 | 11/2008 | Carter et al. |
| 2008/0282348 | A1* | 11/2008 | Proudler et al. ............... 726/22 |
| 2009/0013406 | A1* | 1/2009 | Cabuk et al. ............... 726/22 |
| 2009/0125352 | A1* | 5/2009 | Miyake et al. ............... 705/7 |
| 2009/0125716 | A1 | 5/2009 | Wooten |
| 2009/0204964 | A1 | 8/2009 | Foley et al. |
| 2009/0292705 | A1* | 11/2009 | McKenney et al. ............... 707/8 |
| 2009/0328022 | A1 | 12/2009 | Brogan et al. |
| 2010/0083002 | A1 | 4/2010 | Cui et al. |
| 2010/0281273 | A1* | 11/2010 | Lee et al. ............... 713/190 |
| 2012/0131334 | A1 | 5/2012 | Haikney et al. |
| 2012/0216255 | A1 | 8/2012 | Haikney et al. |
| 2013/0080756 | A1 | 3/2013 | MacKintosh et al. |
| 2013/0212369 | A1 | 8/2013 | Imtiaz et al. |

OTHER PUBLICATIONS

Griffin et al., "Trusted Virtual Domains: Toward Secure Distributed Services", Proceedings of the First Workshop on Hot Topics in System Dependability, Jun. 2005, 6 pages.

Mackintosh et al., "Attesting a Component of a System During a Boot Process," U.S. Appl. No. 13/459,164, filed Apr. 28, 2012, 25 pages.

"TCG Infrastructure Working Group Architecture Part II—Integrity Management", Specification Version 1.0, Revision 1.0, Nov. 2006, 4 pages.

"TCG Specification Architecture Overview", Specification Revision 1.4, Aug. 2007, 4 pages.

Xu et al., "DR@FT: Efficient Remote Attestation Framework for Dynamic Systems," Sep. 2010, Computer Security A Esorics 2010, Springer Berlin Heidelberg, 16 pages.

Jie et al., "A Privacy-Preserving Integrity Measurement Architecture," 2010 Third International Symposium on Electronic Commerce and Security (ISECS), IEEE, Jul. 2010, pp. 242-246 (abstract).

PCT search report dated Feb. 1, 2012 regarding applicatyion PCT/EP2011/064979, international filing date Aug. 31, 2011, applicant International Business Machines Corporation, 4 pages.

Imtiaz et al., "Attesting Use of an Interactive Component During a Boot Process," U.S. Appl. No. 13/820,039, filed Feb. 28, 2013, 35 pages.

"TCG Specification Architecture Overview", Specification Revision 1.4, Aug. 2007, 54 pages.

USPTO Non-Final Office Action, U.S. Appl. No. 13/289,044, Apr. 4, 2013, 17 pages.

USPTO Non-Final Office Action, U.S. Appl. No. 13/459,164, Apr. 12, 2013, 12 pages.

USPTO Non-Final Office Action, U.S. Appl. No. 13/460,080, Apr. 19, 2013, 17 pages.

Haikney et al., "Techniques for Attesting Data Processing Systems," U.S. Appl. No. 13/988,051, and Preliminary Amendment, filed Jul. 29, 2013, 36 pages.

Haikney et al., "Techniques for Attesting Data Processing Systems," U.S. Appl. No. 14/042,267, filed Sep. 30, 2013, 30 pages.

Final Office Action, dated Sep. 27, 2013, regarding U.S. Appl. No. 13/459,164, 31 pages.

Final Office Action, dated Oct. 22, 2013, regarding U.S. Appl. No. 13/289,044, 23 pages.

Final Office Action, dated Oct. 22, 2013, regarding U.S. Appl. No. 13/460,080, 22 pages.

* cited by examiner

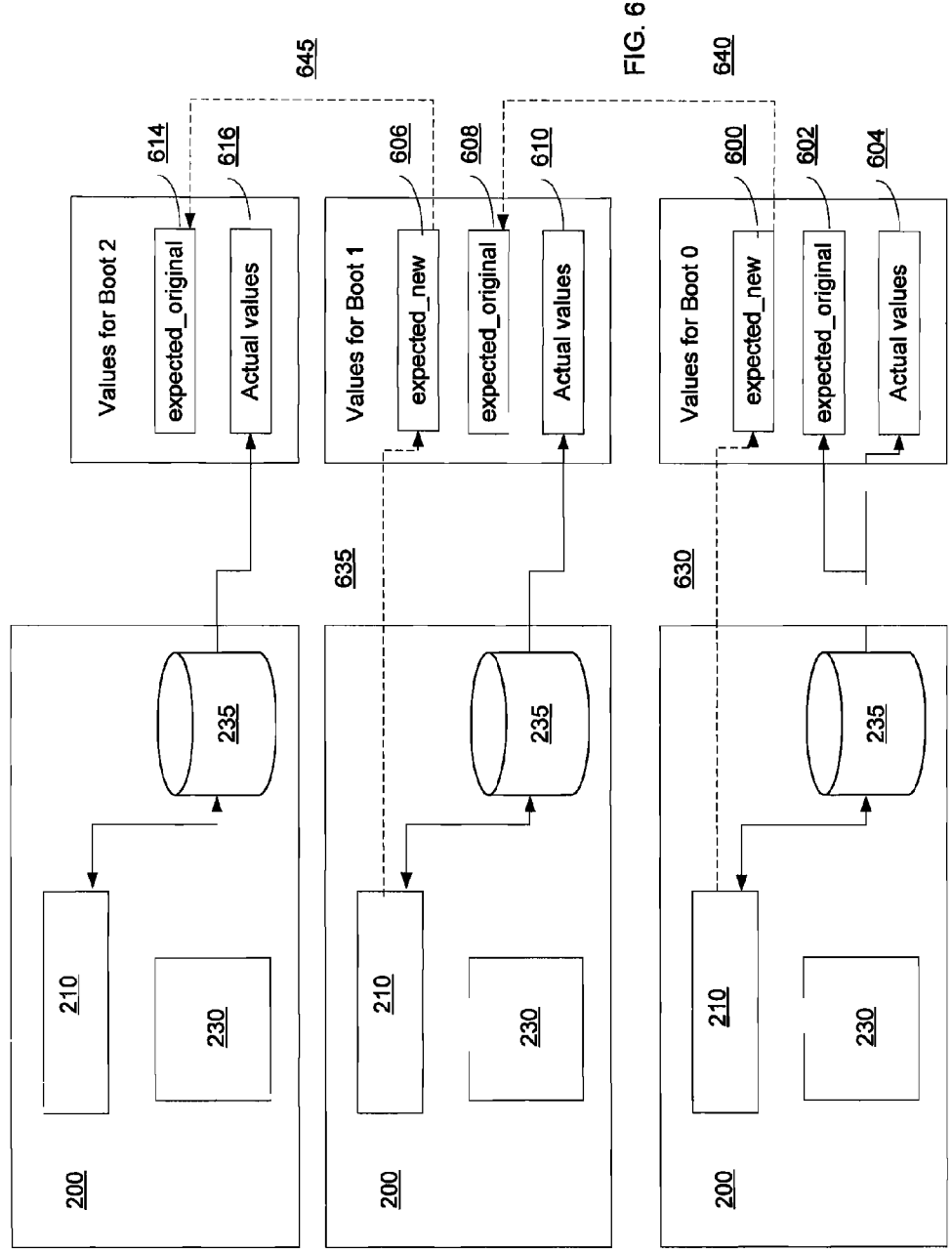

ATTESTING A COMPONENT OF A SYSTEM DURING A BOOT PROCESS

BACKGROUND

1. Field

The present invention relates to a method for attesting a component of a system during a boot process.

2. Description of the Related Art

Trusted boot is a process for booting and establishing a chain of trust in a computing system. With reference to the environment (100) of FIG. 1, for example, a system administrator takes delivery of a server (a managed system (120)) and proceeds to install system software. The managed system (120) comprises a secure device (125), e.g. a TPM (Trusted Platform Module). Once the system (120) is configured and booting, each component (hardware and/or software) of the managed system (120) cryptographically measures another component and can "extend" (but not directly write to) a measurement value into a Platform Configuration Register (PCR) of the TPM (125). Each component is also operable to access an event log in order to write data associated with the measurement of a component into an entry associated with the event log.

The administrator trusts the configuration and takes these initial measurements as trusted. The assumption is that no one has subverted the system after the install/configuration and before the measurements were recorded.

The measurements can be remotely attested by a managing system (105) which has a database (115) to store expected attestation values for components of each managed system. The values would typically be stored along with some metadata describing what the values mean. The managing system (105) comprises a TPM emulator (110) for e.g., comparing the measurements with the values. If there is no match between the measurements and the values, typically, the managing system (105) further has to compare the measurements against a (large) list (e.g., a reference manifest) of measurement values provided by manufacturers of components. Typically, a reference manifest comprises a large number of measurement values associated with each component of a managed system (200) and these measurement values can be taken to be "trusted".

The remote attestation process itself may be initiated by either the managing or managed system.

Changes to the managed system (120) can be detected by subsequent trusted boot and remote attestation processes.

The above processes are described, for example, in section 4 of the Trusted Computing Group (TCG) Specification Architecture Overview; Specification; Revision 1.4; 2 Aug. 2007 and section 2 of the TCG Infrastructure Working group Architecture Part II—Integrity Management; Specification Version 1.0; Revision 1.0; 17 Nov. 2006.

Maintaining a database of trusted values (from a reference manifest) for managed systems that a managing system manages is complex e.g., due to heterogeneous platform configurations; due to trusted values genuinely varying between managed systems having the same configuration because of differences such as processor count or identical software which configured itself differently during installation—in practice, two managed systems with an identical software and hardware configuration may have different trusted values despite both managed systems having booted in a trusted manner.

SUMMARY

The present invention provides a mechanism for enrollment-based trust which alleviates the problem of trusted value maintenance and interpretation while still allowing for a single managing system for heterogeneous managed systems.

The trusted boot process is designed primarily to protect against modifications to the boot process which occur while the managed system is inactive or at rest. An example is the mounting of a primary operating system's disk from a second operating system and modifying the primary operating system's code to allow malicious access when the primary operating system next boots. Such changes to the primary operating system code are reflected once the managed system is booted. The trusted boot process does not protect against malicious attacks after the managed system has completed booting. There is therefore an implicit assumption that a managed system which boots in a trusted manner is executing secure code that will not be compromised at run time.

According to a first aspect, the present invention provides a method for attesting a component of a system during a boot process, comprising the steps of: verifying that the system is in a trusted state; in response to verifying that the system is in a trusted state, requesting an enrollment of the system wherein the requesting step further comprises the step of: retrieving enrollment data associated with the system; retrieving current input data associated with the component of the system; comparing the current input data against the enrollment data in order to determine whether the system can retain its trusted state; wherein in response to the comparing step, if the current input data matches the enrollment data, the system retains its trusted state; and accepting the trusted state until receipt of a notification, from the system having a retained trusted state, of an update to the system.

According to a second aspect, the present invention provides an apparatus for attesting a component of a system during a boot process, comprising: means for verifying that the system is in a trusted state; means, responsive to verifying that the system is in a trusted state, for requesting an enrollment of the system wherein the requesting means further comprises means for retrieving enrollment data associated with the system; means for retrieving current input data associated with the component of the system; means for comparing the current input data against the enrollment data in order to determine whether the system can retain its trusted state; wherein in response to the comparing means, if the current input data matches the enrollment data, the system retains its trusted state; and means for accepting the trusted state until receipt of a notification, from the system having a retained trusted state, of an update to the system.

According to a third aspect, the present invention provides a computer program comprising computer program code stored on a computer readable medium to, when loaded into a computer system and executed thereon, cause said computer system to perform all the steps of a method according to the method above.

BRIEF DESCRIPTION OF THE SEVERAL VIEWS OF THE DRAWINGS

The present invention will now be described, by way of example only, with reference to preferred embodiments thereof, as illustrated in the following drawings:

FIG. 6 is a block diagram showing state changes that occur during the process of FIG. 5.

DETAILED DESCRIPTION

A more detailed explanation of known trusted boot and remote attestation processes will now be given.

Figure 1:
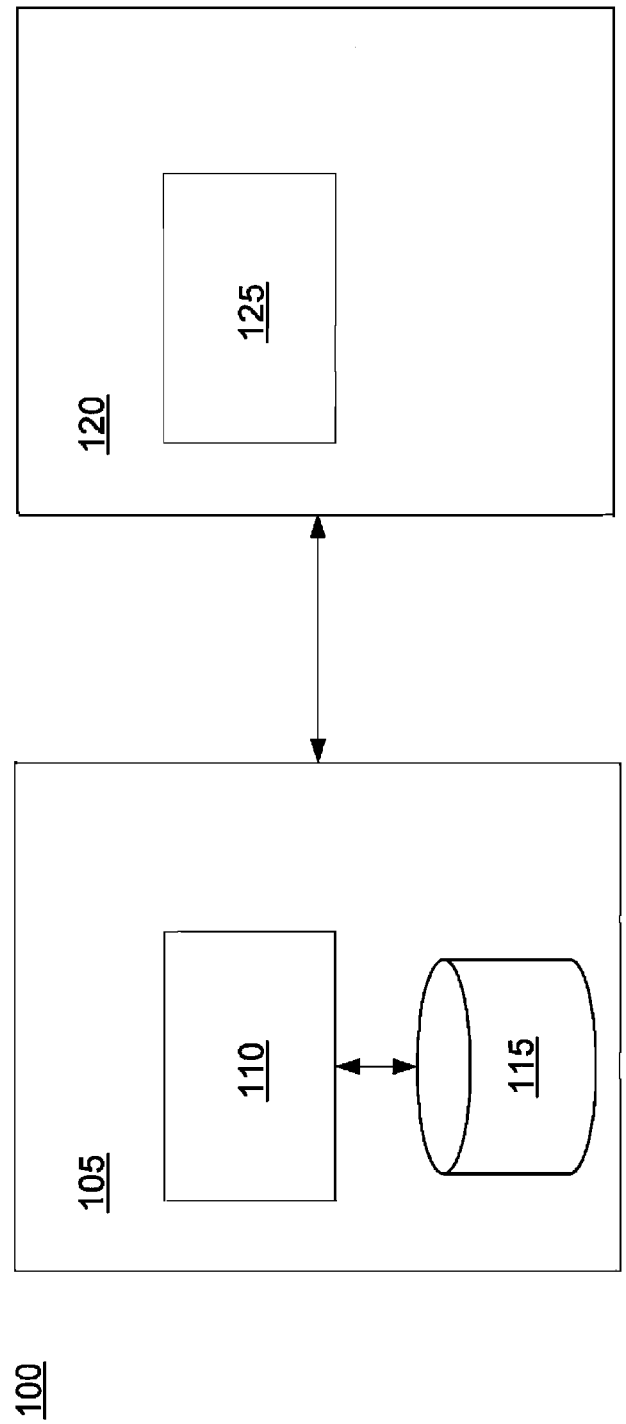
FIG. 1 is a block diagram showing a known system for carrying out trusted boot and remote attestation processes.
Figure 2:
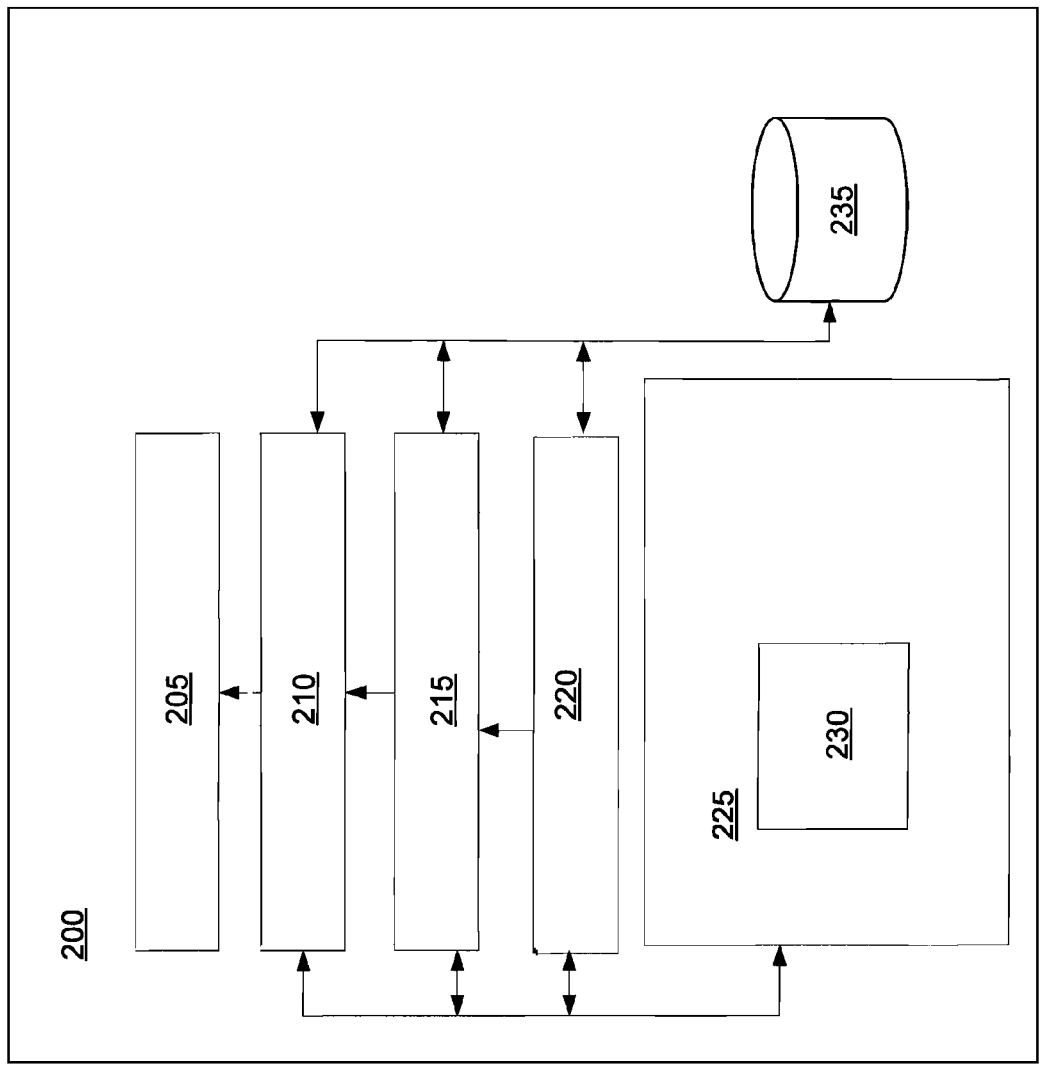
FIG. 2 is a block diagram showing the components of a known managed system.

With reference to FIG. 2, there is shown a managed system (200) in more detail. During a trusted boot process, each component of the managed system (200) cryptographically measures (e.g., using Secure Hash Algorithm (SHA) to create a hash of information such as a software file; a model; make; serial number of a component etc. in order to create a measurement value) another boot component.

In an example, a Core Root of Trust for Measurement (CRTM) component (220), for example, BIOS, is the first piece of code which is given control during boot and must be implicitly trusted as it is immutable. The CRTM (220) cryptographically measures the next component in the boot process (e.g., firmware (215)); subsequently the firmware (215) measures the next component in the boot process (e.g., an operating system (210)); and subsequently the operating system (210) measures any user space programs (205) before control is transferred to the user space program (205).

Each component can "extend" (but not directly write to) a measurement value into a Platform Configuration Register (PCR) (230) of a TPM (225) before control is transferred to the measured component. An extend operation comprises a cryptographic combination of a current value of the PCR (230) and a measurement value—it is signed with a public/private key pair of the managed system (200) whereby the private key is known only to the TPM (225).

Each component is also operable to access an event log (235) in order to write data associated with the measurement of a component (e.g., metadata such as a component identifier and an event; and an associated measurement value) into an entry associated with the event log (235).

Note that the CRTM (220) executes in a restricted environment where it can not typically access the event log (235). Note also that although a user space program (205) is operable to use the TPM (225) and the event log (235), it is optional as to whether it does so since the user space program (205) does not tend to load other software components itself.

Once the managed system (200) is running, data associated with a "chain of trust" can be extracted for inspection by a remote system (305) using a remote attestation procedure e.g. DAA (Direct Anonymous Attestation) as will be described herein.

Figure 3:
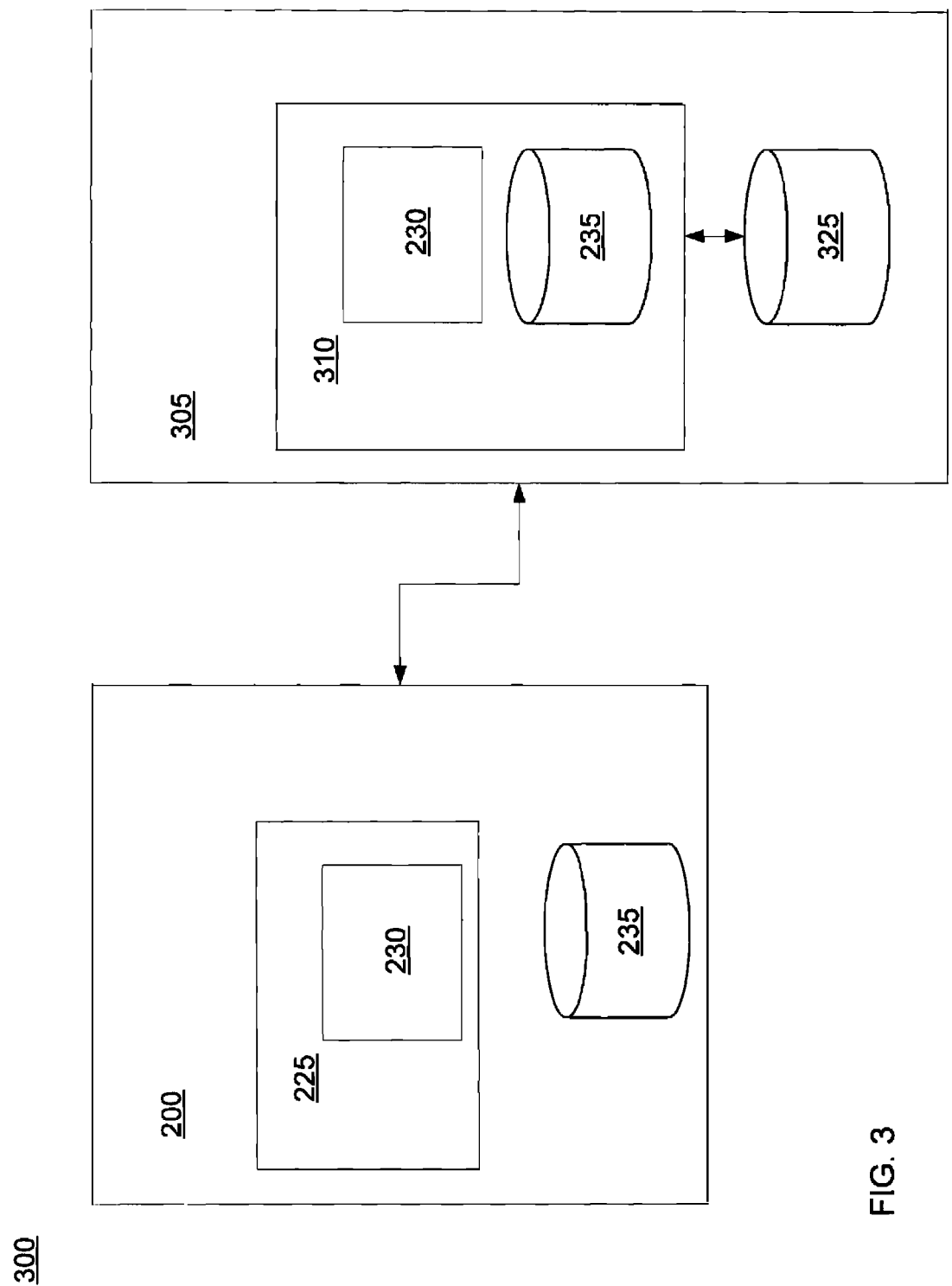
FIG. 3 is a block diagram showing a more detailed view of a known system for carrying out trusted boot and remote attestation processes.

With reference to the system (300) of FIG. 3, there is shown the managed system (200) and associated TPM (225); PCRs (230); and event log (235) comprising one or more measurement values and associated metadata. An attestation process typically involves the managed system (200) sending the current PCRs (230) for measured components together with the event log (235) to a managing system (305).

Figure 4:
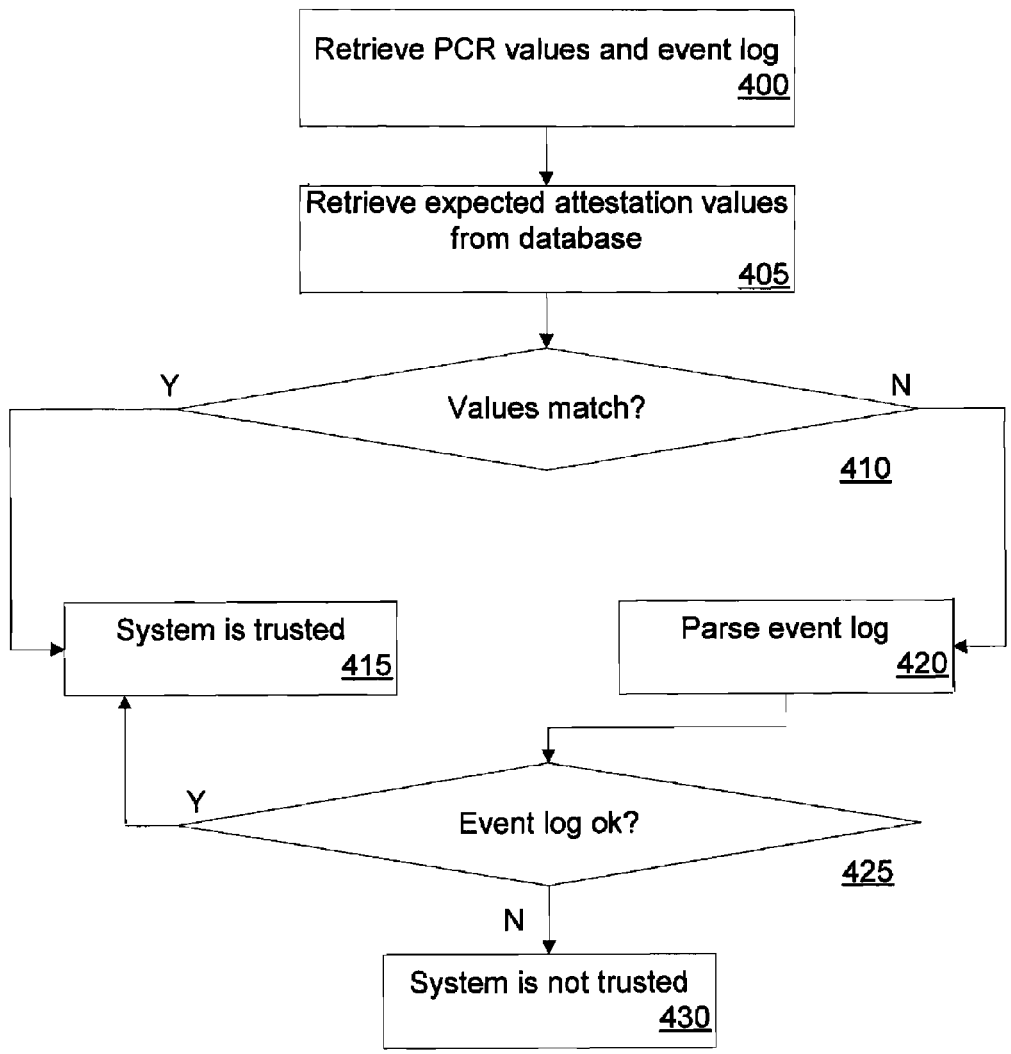
FIG. 4 is a flow chart showing the operational steps involved in a known remote attestation process.

A simplified example of an attestation process performed on the managing system (305) will now be described with reference to FIG. 4.

At step 400, the received current PCRs (230) together with the event log (235) are retrieved. At step 405, expected attestation values associated with components of the managed system (200) are retrieved from a database (325). At step 410, an emulator (310) of the managing system (305) compares the values of the received PCRs (230) with the expected attestation values. It should be understood that a number of other components of the managing system (305) could execute the comparison logic.

If a match occurs for each PCR value, the managed system (200) is considered to be trusted (step 415) and no further work is done.

If a match does not occur for each PCR value, the managing system (305) parses (step 420) the event log (235), inspecting each entry in turn to decide whether or not measurement value(s) contained in an entry associated with a measured component in question is valid.

If each event log (235) entry appears to be valid (positive result to step 425), the managed system (200) is considered to be trusted (step 415) and no further work is done.

If the event log entry appears not to be valid (negative result to step 425), the managed system (200) is not considered to be trusted (step 430)—preferably, a security alert is raised before moving to a "System untrusted" exit state.

An example implementation of the above process will now be described.

Typically, manufacturers of components of the managed system (200) provide a (large) list (e.g., a reference manifest) of measurement values associated with a component—these measurement values can be taken to be "trusted". Further, typically, the trusted boot process is highly deterministic and associated events which appear in the event log (235) follow a strict pattern. In an example where the CRTM (220) measures the firmware (215) which in turn measures the operating system (210), the event log (235) typically comprises two events, namely, "firmware measured" and "operating system measured". Even if the firmware (215) and/or the operating system (210) are changed (e.g., updated), during a future boot process, the same two events will occur in the same order and only the associated measurement values will differ.

In an example, each measurement value is associated with the same PCR. In the example, the managing system (305) keeps a record indicating that the last time the managed system (200) booted, it was using firmware, e.g., having version X with a measurement of M1 and an operating system, e.g., having version Y with a measurement of M2, where M1 and M2 are SHA digests of the firmware boot component and operating system boot component, respectively. The two events together with the measurement values, namely, "firmware measured: SHA(M1)" and "operating system measured: SHA(M2)", when extended into a PCR, give a PCR value of "Z". The PCR value of "Z" is recorded as an expected attestation value for the firmware (215) and the operating system (210) in the database (325) of the managing system (305).

During a subsequent attestation process, the managing system (305) retrieves (step 400) the received current PCRs (230) together with the event log (235) and retrieves (step 405) the expected attestation values from the database (325).

At step 410, the emulator (310) compares the values of the received PCRs with the expected attestation values—if a match occurs, it is determined (step 415) that the managed system (200) is using the expected firmware (215) and operating system (210).

If a match does not occur, (i.e., the received PCR value is not "Z"), the managing system (305) parses (step 420) the event log (235) to find associated entries. The managing system (305) compares the first event and measurement value, namely, "firmware measured: SHA(M1)" with a list of trusted values provided by the particular manufacturer of the firmware and compares the second event and measurement value, namely, "operating system measured: SHA(M2)" with a list of trusted values provided by the particular manufacturer of the operating system.

If either component has a measurement value which the manufacturer has not listed as "trusted", the managed system (200) is assumed (step 430) to be compromised.

If both components have a measurement value which the manufacturer has listed as "trusted", the managed system (200) is assumed (step 415) to be trusted and the measurement values can be associated with a new expected attestation value(s) that is used during the next attestation process of the managed system (200).

Trusted boot and remote attestation processes of the preferred embodiment will now be described with reference to FIGS. 5 and 6.

Advantageously, in the preferred embodiment, a managing system need not analyze a reference manifest from manufacturers of each component for each managed system as will be described below.

As described above, an assumption is that no one has subverted a managed system (200) after the initial install/configuration and before measurement values were recorded—thus, on a first boot process of the managed system (200), the managed system (200) is assumed to be implicitly trusted. Alternatively, the managed system (200) can be manually inspected on a first boot process in order to determine whether it should be trusted.

In a pre-processing step, based on e.g., the assumption above and/or the manual inspection, the managed system (200) is considered to be in a trusted state. Subsequently, according to the preferred embodiment, when, e.g., a managed system (200) is added to a distributed computing environment, the managing system (305) requests an "enrollment" of the managed system (200).

Figure 5:
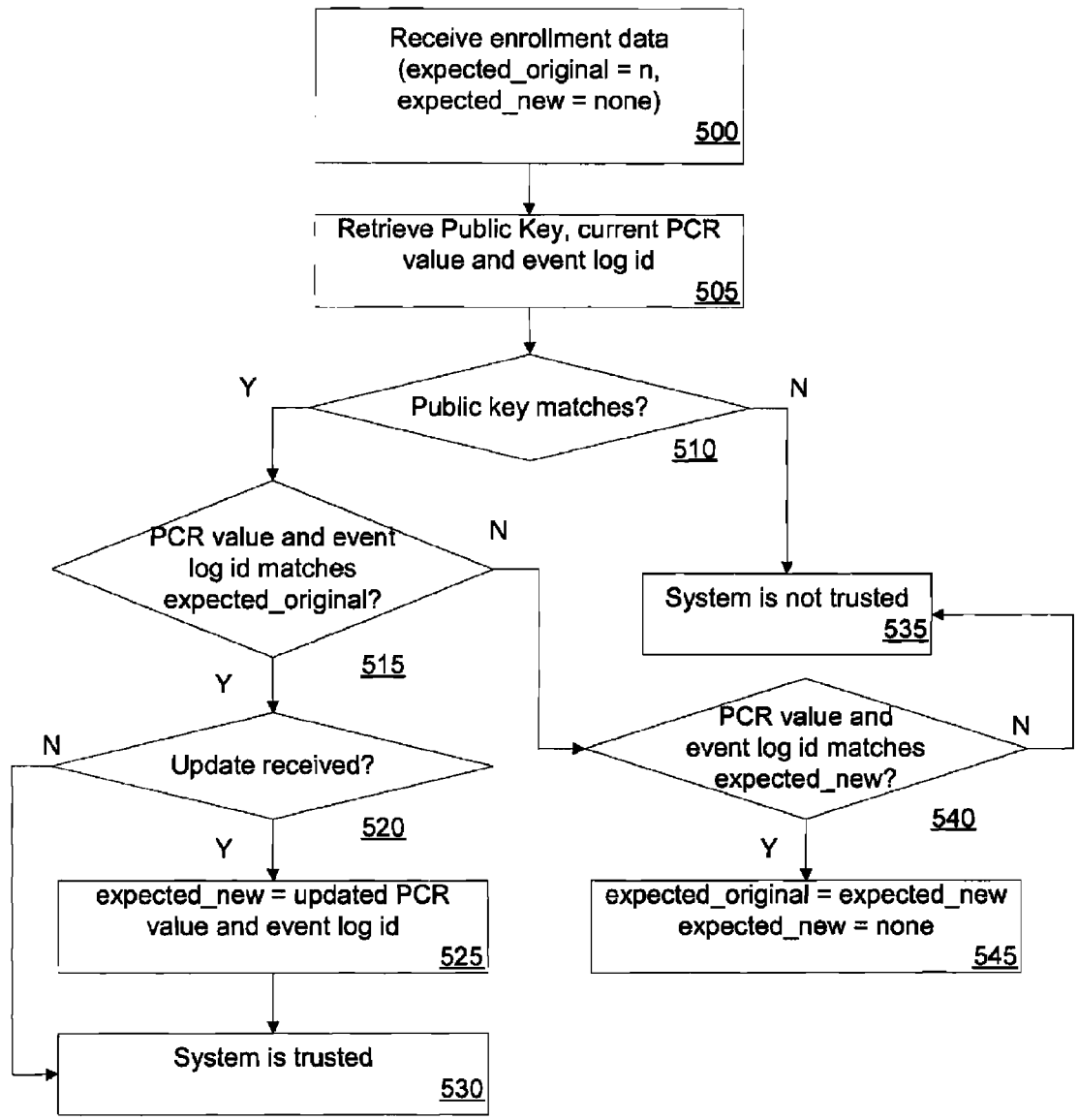
FIG. 5 is a flow chart showing the operational steps involved in trusted boot and remote attestation processes according to the preferred embodiment.

With reference to FIG. 5, at step 500, data associated with the enrollment is requested, namely, values for "expected_original" (namely, expected attestation values) associated with a current PCR value (i.e., resulting from an extend operation) of a boot process of the managed system (200) and an event log (235) identifier (wherein the identifier is associated with changes to the event log (235)), each signed using the public key and associated private key of the managed system (200).

Also, values for "expected_new" associated with an updated current PCR value (i.e., resulting from an extend operation) and an updated event log (235) identifier where updates (e.g., version change) to one or more components of the managed system (200) have occurred, each signed using the public key and associated private key of the managed system (200).

The enrollment data is recorded by the managing system (305) e.g., in the database (325).

Note that values for expected_new may not be seen until a managed system (200) reboots.

Prior to step 505, the managed system (200) reboots.

At step 505, the public key of the managed system (200); current PCR values (230) and an event log (235) identifier are retrieved.

At step 510, the managing system (305) compares the public key of the managed system (200) with public key enrollment data that it has stored. If the public key of the managed system (200) does not match any public key enrollment data that has been stored, the managed system (200) is deemed not trusted (step 535).

If the public key of the managed system (200) does match any public key enrollment data that has been stored, the managing system (305) compares (step 515) a retrieved current PCR value (230) and the event log (235) identifier against stored expected_original values for the managed system (200).

If a retrieved current PCR value (230) and the event log (235) identifier matches the stored expected_original values, the managed system (200) is deemed trusted. It should be noted that the managing system (305) can periodically, or upon direction, perform additional attestations of the managed system (200). The trusted state is accepted until a notification regarding an update to the managed system (200) is received from the managed system (200) while it is in a trusted state.

At step 520, it is determined whether an update to a component of the managed system (200) has been received e.g., if a software update has occurred.

If an update has occurred, the managed system (200) sends an updated associated PCR value and an updated event log (235) identifier to the managing system (305) e.g., using a notification channel such as the Common Information Model (CIM) connection. It should be noted that as the managed system (200) is already in a trusted state, the managed system (200) is able to inform the managing system (305) that there are valid updates to PCR values and an event log (235) identifier.

The updated PCR value and event log (235) identifier are associated (step 525) with values for expected_new. The managed system (200) is deemed trusted (step 530).

If the managing system (305) does not receive (step 520) an update to a component of the managed system (200), the managed system (200) is deemed trusted (step 530) and no further work is done. The managed system (200) may re-boot at a later time and unless notified, the managing system (305) will expect an identical attestation.

At step 515, if the retrieved current PCR values (230) and the event log (235) identifier do not match the stored expected_original values, at step 540, it is determined whether the retrieved current PCR value (230) and the event log (235) identifier match the stored expected_new values.

If the retrieved current PCR value (230) and the event log (235) identifier do not match the stored expected_new values, the managed system (200) is deemed not trusted (step 535). Preferably, a security alert is raised.

At step 540, if the retrieved current PCR values (230) and the event log (235) identifier match the stored expected_new values, the stored values for expected_original are replaced with the matching stored expected_new values—thus, the matching stored expected_new values become the only valid expected attestation values. Further, the stored values for expected_new are reset to zero.

Note that there is no need to explicitly watch for reboots of the managed system (200). It can be implicitly concluded that the managed system (200) has rebooted whenever an attestation matches the stored expected_new values rather than the stored expected_original values.

It should be understood that the trusted state of the managed system (200) can be perpetuated across boot iterations, until attestation fails, at which point a security alert is raised.

In a worked example, at step 500, data associated with the enrollment of a managed system (200) is requested, namely, values for "expected_original" associated with a current PCR value (P0) (i.e., resulting from an extend operation) of a boot process of the managed system (200) and an event log (235) identifier (E0), each signed using the public key (K) and associated private key of the managed system (200).

For example, the following enrollment data is recorded by the managing system (305): expected_original=[P0, E0, K].

In a simplified example, the managed system (200) comprises firmware (215) having version FW0 and measurement value of M[FW0] and an operating system (210) having version OS0 and measurement value of M[OS0].

The PCR value P0 is associated with M[FW0] and M[OS0].

The event log E0 comprises two entries, namely: "Firmware Measured: M[FW0]" and "Operating System Measured: M[OS0]".

Values for "expected_new" associated with an updated current PCR value (i.e., resulting from an extend operation) and an updated event log (235) identifier, each signed using the public key and associated private key of the managed system (200) where updates to one or more components of the managed system (200) have occurred are also requested.

In the current example, no values for expected_new are sent by the managed system (200) and the following enrollment data is recorded by the managing system (305): expected_new=[none, none, none].

Assuming that following a reboot of the managed system (200) and execution of step 505, the public key of the managed system (200) does match (step 510) any public key enrollment data that has been stored, the managing system (305) compares (step 515) a retrieved current PCR value (230) and event log (235) identifier against stored expected_original values for the managed system (200).

In the example, if the retrieved current PCR value (230) and event log (235) identifier match the stored expected_original values (namely, P0 and E0, respectively), the managed system (200) is deemed trusted.

As described above, the managing system (305) can repeatedly attest the managed system (200) at times of its own choosing—each time the retrieved current PCR value is P0; the event log identifier is E0 and the public key is K (and thus, each value is associated with the values for expected_original), the managed system (200) remains trusted.

At step 520, it is determined whether an update to a component of the managed system (200) has been received.

In the example, the managed system (200) applies a patch to the operating system (210), changing the version of the operating system (210) code which will be loaded on the next boot to "OS1"—the operating system (210) has a resulting measurement value of M[OS1].

An updated PCR value P1 is associated with M[FW0] and M[OS1].

An updated event log E1 comprises two entries, namely: "Firmware Measured: M[FW0]" and "Operating System Measured: M[OS1]".

As such, the managed system (200) sends the updated PCR value and the updated event log (235) identifier, each signed using the public key and associated private key of the managed system (200) to the managing system (305) where expected_new=[P1, E1, K].

The managing system (305) receives expected_new and maintains and stores (step 525) the following enrollment data, respectively:
expected_original=[P0, E0, K]
expected_new=[P1, E1, K]

The system is deemed trusted (step 530).

Note that (e.g., on a subsequent reboot of the managed system (200)) at step 515, if the retrieved current PCR value (230) and event log (235) identifier do not match the stored expected_original values, at step 540, it is determined whether the retrieved current PCR value (230) and event log (235) identifier match the stored expected_new values.

If the retrieved current PCR value (230) and event log (235) identifier do not match the stored expected_new values, the managed system (200) is deemed not trusted (step 535).

In the example, if the retrieved current PCR value (230) is P1; the event log (235) identifier is E1 and the public key is K, (that is, a match occurs with the stored expected_new values), at step 545, the stored values for expected_original are replaced with the matching stored expected_new values and the stored values for expected_new are reset to zero.

For example, the following enrollment data is recorded by the managing system (305):
expected_original=[P1, E1, K]
expected_new=[<none>,<none>,<none>]

FIG. 6 is a block diagram showing state changes that occur during the process of FIG. 5 where current PCR values (604) for the managed system (200) and expected attestation values (e.g., values for expected_original) (602), associated with a first boot process ("Boot 0") of the managed system (200) are depicted. If an update to a component (210) of the managed system (200) occurs during Boot 0, the stored values for expected_new (600) are replaced (flow 630) with an updated PCR value and an updated event log (235) identifier. Note that the values for expected_new (600) are used (flow 640) as the new values for expected_original (608) on a subsequent boot process ("Boot 1") (whereby, current PCR values (610) for the managed system (200) for Boot 1 are also depicted).

Likewise, if an update to a component (210) of the managed system (200) occurs during Boot 1, the stored values for expected_new (606) are replaced (flow 635) with an updated PCR value and an updated event log (235) identifier. Note that the values for expected_new (606) are used (flow 645) as the new values for expected_original (614) on a subsequent boot process ("Boot 2") (whereby, current PCR values (616) for the managed system (200) for Boot 2 are also depicted).

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. An apparatus for attesting a component of a system during a boot process, comprising a processor coupled to a memory that contains instructions that are executable by the processor to perform steps of:
    verifying that the system is in a trusted state;
    in response to verifying that the system is in a trusted state, requesting an enrollment of the system, wherein the requesting step further comprises retrieving enrollment data associated with the system;
    retrieving current input data associated with the component of the system;
    comparing the current input data against the enrollment data in order to determine whether the system can retain its trusted state;
    if the current input data matches the enrollment data in response to the comparing step, the system retains its trusted state; and
    accepting the trusted state until receipt of a notification, from the system having a retained trusted state, of an update to the system.

2. The apparatus of claim 1 wherein the memory contains further instructions that are executable by the processor to cause the apparatus to perform steps of:
    receiving the notification from the system that the component of the system has been updated;
    retrieving updated current input data associated with the component in response to the notification being received; and
    storing the updated current input data.

3. The apparatus of claim 2, wherein the memory contains further instructions that are executable by the processor to cause the apparatus to perform steps of:
    retrieving further current input data associated with the component of the system; and
    comparing the further current input data against the updated current input data in order to determine whether the system can retain its trusted state.

4. The apparatus of claim 3, wherein if the further current input data matches the updated current input data in response to the comparing of the further current input data, the system retains its trusted state.

5. The apparatus of claim 4, wherein the enrollment data is replaced with the updated current input data if the further current input data matches the updated current input data in response to the comparing of the further current input data, wherein the enrollment data that is replaced was retrieved when requesting the enrollment of the system by the apparatus in response to verifying that the system is in a trusted state, and the updated current input data that replaces the enrollment data was retrieved by the apparatus in response to the notification being received by the apparatus.

6. The apparatus of claim 1, wherein the enrollment data that was retrieved when requesting the enrollment of the system by the apparatus comprises a measurement value of the component; an event log identifier and a public key of the system.

7. The apparatus of claim 6, wherein the event log identifier identifies an event log that comprises the current input data and an identifier of the component.

8. The apparatus of claim 2, wherein the updated current input data retrieved by the apparatus comprises an updated measurement value of the component; an updated event log identifier and a public key of the system.

9. The apparatus of claim 1, wherein the verifying step comprises at least one of: inspecting the system and asserting a trusted state assumption associated with a period between initial installation of the system and the current input data being generated.

10. An apparatus for attesting a component of a system during a boot process, comprising a processor coupled to a memory that contains instructions that are executable by the processor to perform steps of:
    verifying that the system is in a trusted state;
    in response to verifying that the system is in a trusted state, requesting an enrollment of the system, wherein the requesting step further comprises retrieving enrollment data associated with the system;
    retrieving current input data associated with the component of the system;
    comparing the current input data against the enrollment data in order to determine whether the system can retain its trusted state;
    if the current input data matches the enrollment data in response to the comparing step, the system retains its trusted state;
    accepting the trusted state until receipt of a notification, from the system having a retained trusted state, of an update to the system;
    receiving the notification from the system that the component of the system has been updated;
    retrieving updated current input data associated with the component in response to the notification being received;
    storing the updated current input data;
    retrieving further current input data associated with the component of the system;

comparing the further current input data against the updated current input data in order to determine whether the system can retain its trusted state; and setting values associated with the updated current input data to null if the further current input data matches the updated current input data in response to the comparing of the further current input data.

11. A computer program product comprising computer program code stored on a non-transitory computer readable storage medium to, when loaded into a computer system and executed thereon, cause said computer system to perform the steps of:

verifying that the system is in a trusted state;

in response to verifying that the system is in a trusted state, requesting an enrollment of the system, wherein the requesting step further comprises retrieving enrollment data associated with the system;

retrieving current input data associated with the component of the system;

comparing the current input data against the enrollment data in order to determine whether the system can retain its trusted state;

if the current input data matches the enrollment data in response to the comparing step, the system retains its trusted state; and accepting the trusted state until receipt of a notification, from the system having a retained trusted state, of an update to the system.

12. The computer program product of claim 11 further comprising:

receiving the notification from the system that the component of the system has been updated;

retrieving updated current input data associated with the component in response to the notification being received; and storing the updated current input data.

13. The computer program product of claim 12, further comprising:

retrieving further current input data associated with the component of the system; and comparing the further current input data against the updated current input data in order to determine whether the system can retain its trusted state.

14. The computer program product of claim 13, wherein if the further current input data matches the updated current input data in response to the comparing of the further current input data, the system retains its trusted state.

15. The computer program product of claim 14, wherein the enrollment data is replaced with the updated current input data if the further current input data matches the updated current input data in response to the comparing of the further current input data, wherein the enrollment data that is replaced was retrieved when requesting the enrollment of the system by the apparatus in response to verifying that the system is in a trusted state, and the updated current input data that replaces the enrollment data was retrieved by the apparatus in response to the notification being received by the apparatus.

16. The computer program product of claim 11, wherein the enrollment data that was retrieved when requesting the enrollment of the system by the apparatus comprises a measurement value of the component; an event log identifier and a public key of the system.

17. The computer program product of claim 16, wherein the event log identifier identifies an event log that comprises the current input data and an identifier of the component.

18. The computer program product of claim 12, wherein the updated current input data retrieved by the apparatus comprises an updated measurement value of the component; an updated event log identifier and a public key of the system.

19. The computer program product of claim 11, wherein the verifying step comprises at least one of: inspecting the system and asserting a trusted state assumption associated with a period between initial installation of the system and the current input data being generated.

20. A computer program product comprising computer program code stored on a non-transitory computer readable storage medium to, when loaded into a computer system and executed thereon, cause said computer system to perform the steps of:

verifying that the system is in a trusted state;

in response to verifying that the system is in a trusted state, requesting an enrollment of the system, wherein the requesting step further comprises retrieving enrollment data associated with the system;

retrieving current input data associated with the component of the system;

comparing the current input data against the enrollment data in order to determine whether the system can retain its trusted state;

if the current input data matches the enrollment data in response to the comparing step, the system retains its trusted state;

accepting the trusted state until receipt of a notification, from the system having a retained trusted state, of an update to the system;

receiving the notification from the system that the component of the system has been updated;

retrieving updated current input data associated with the component in response to the notification being received:

storing the updated current input data; retrieving further current input data associated with the component of the system;

comparing the further current input data against the updated current input data in order to determine whether the system can retain its trusted state; and setting values associated with the updated current input data to null if the further current input data matches the updated current input data in response to the comparing of the further current input data.

21. An apparatus for attesting a component of a system during a boot process, comprising a processor coupled to a memory that contains instructions that are executable by the processor to perform steps of:

verifying that the system is in a trusted state during the boot process;

in response to verifying that the system is in a trusted state, requesting an enrollment of the system with the apparatus, wherein the requesting step further comprises receiving enrollment data associated with the system;

responsive to re-booting the system, verifying that the system is in a trusted state during the re-booting process using the enrollment data, wherein the enrollment data was received when requesting the enrollment of the system with the apparatus, in lieu of trusted values provided by a trusted source.

22. The apparatus of claim 21, wherein the enrollment data that was retrieved when requesting the enrollment of the system by the apparatus comprises a measurement value of the component; an event log identifier of an event log where the enrollment data is maintained, and a public key of the system.

23. The apparatus of claim 21, wherein the apparatus further comprises a trusted platform module (TPM) emulator that is configured to verify that the system is in the trusted state.

* * * * *